(12) United States Patent  
Neugebauer et al.

(10) Patent No.: US 11,806,683 B2
(45) Date of Patent: Nov. 7, 2023

(54) FLUIDIZING NOZZLE AND FLUIDIZED BED REACTOR

(71) Applicant: METSO OUTOTEC FINLAND OY, Tampere (FI)

(72) Inventors: Lars Neugebauer, Frankfurt am Main (DE); Linus Perander, Sandefjord (NO); Eugen Weissenburger, Frankfurt am Main (DE); Andreas Orth, Friedrichsdorf (DE); Joerg Hammerschmidt, Erlensee (DE); Maciej Wrobel, Florstadt (DE)

(73) Assignee: METSO OUTOTEC FINLAND OY, Tampere (FI)

( * ) Notice: Subject to any disclaimer, the term of this patent is extended or adjusted under 35 U.S.C. 154(b) by 0 days.

(21) Appl. No.: 17/968,928

(22) Filed: Oct. 19, 2022

(65) Prior Publication Data

US 2023/0053424 A1 Feb. 23, 2023

Related U.S. Application Data

(63) Continuation of application No. PCT/FI2020/050399, filed on Jun. 9, 2020.

(51) Int. Cl.
*B01J 8/24* (2006.01)
*B01J 8/18* (2006.01)
*B01J 8/00* (2006.01)

(52) U.S. Cl.
CPC ............. *B01J 8/004* (2013.01); *B01J 8/1818* (2013.01); *B01J 8/24* (2013.01); *B01J 2208/00548* (2013.01)

(58) Field of Classification Search
CPC ... B01J 8/004; B01J 8/1818; B01J 8/24; B01J 2208/00548

(Continued)

(56) References Cited

U.S. PATENT DOCUMENTS 3,914,089 A 10/1975 Desty et al.
4,387,667 A * 6/1983 Goodstine ................. B01J 8/44
34/585

FOREIGN PATENT DOCUMENTS

CN 201875695 U 6/2011
CN 206001451 U 3/2017
(Continued)

OTHER PUBLICATIONS

International Search Report issued by the Finnish Patent and Registration Office acting as the International Searching Authority in relation to International Application No. PCT/FI2020/050399 dated Sep. 16, 2020 (5 pages).

(Continued)

*Primary Examiner* — Huy Tram Nguyen
(74) *Attorney, Agent, or Firm* — Robert P. Michal, Esq.; Carter, DeLuca & Farrell LLP

(57) ABSTRACT

A fluidizing nozzle for introducing fluid into a fluidized bed reactor and a fluidized bed reactor. The fluidizing nozzle includes a nozzle tube limiting at least a part of a feed channel in which fluid is configured to flow, at least one fluid discharge opening arranged near a downstream end of the nozzle tube, and a pot-like hood, which sealingly closes the nozzle tube with a hood cover of the pot-like hood at the downstream end of the nozzle tube at which said at least one fluid discharge opening is provided. The feed channel is provided with a flow restriction element defining at least one flow restriction feed channel upstream of said at least one fluid discharge opening.

24 Claims, 7 Drawing Sheets

Figure 1:
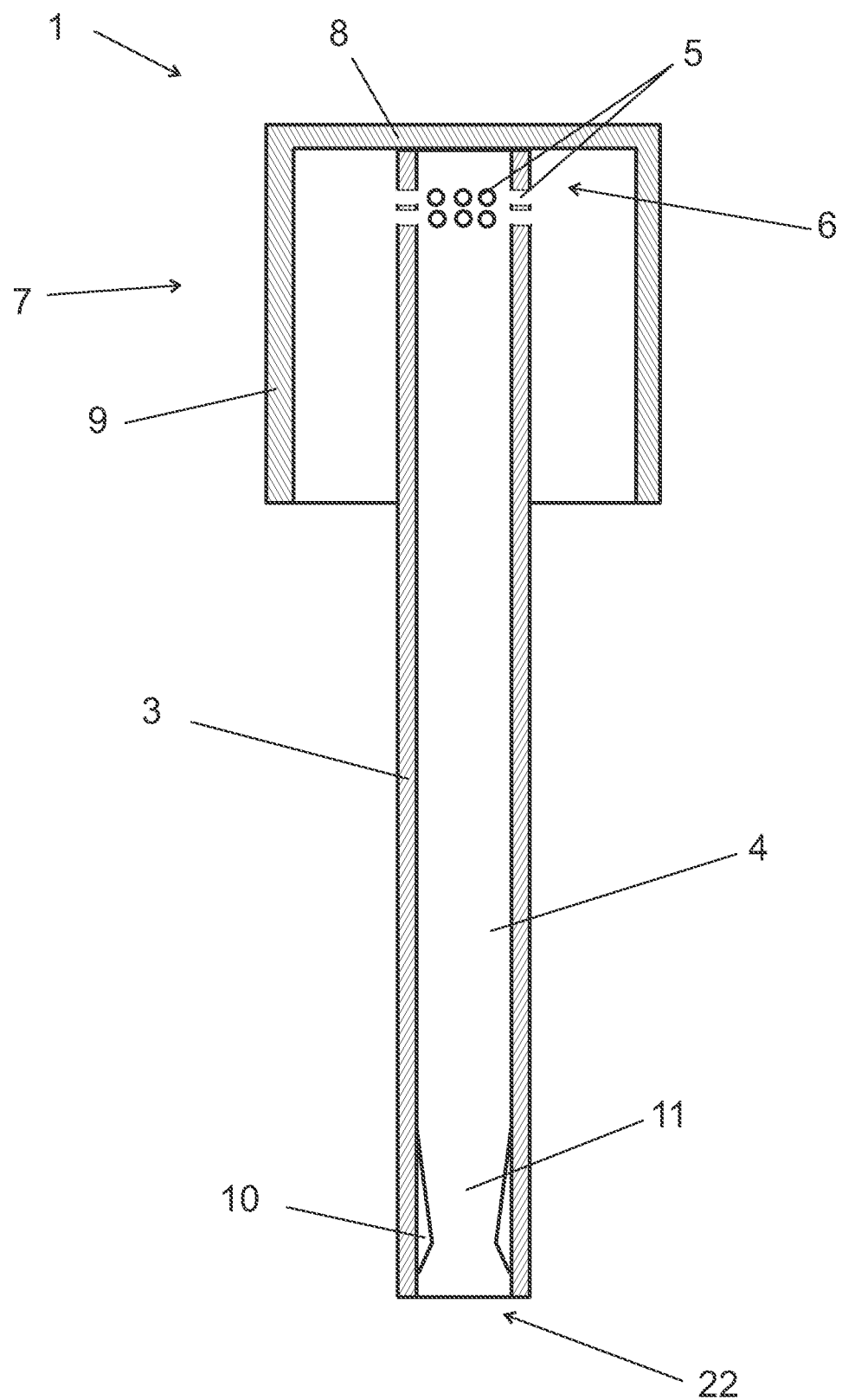

(58) Field of Classification Search
USPC .......................................................... 422/139
See application file for complete search history.

(56)     References Cited

FOREIGN PATENT DOCUMENTS

| CN | 206018604 U      | 3/2017  |              |
|----|------------------|---------|--------------|
| CN | 109780538 A      | 5/2019  |              |
| DE | 102007028438 A1 *| 12/2008 | ...... B01J 8/44 |
| JP | H02275203 A      | 11/1990 |              |
| WO | 2005095854 A1    | 10/2005 |              |
| WO | 2012011845 A1    | 1/2012  |              |

OTHER PUBLICATIONS

Written Opinion of the International Searching Authority issued by the Finnish Patent and Registration Office acting as the International Searching Authority in relation to International Application No. PCT/FI2020/050399 dated Sep. 16, 2020 (6 pages).

International Preliminary Report on Patentability issued by the European Patent Office acting as the International Preliminary Examining Authority in relation to International Application No. PCT/FI2020/050399 dated Nov. 23, 2021 (22 pages).

Saudi Arabian Notification of the Substantive Examination Report dated May 12, 2023 (6 pages) and English translation (5 pages), issued in corresponding Saudi Arabian Appln. No. 522441611, 11 total pages.

* cited by examiner

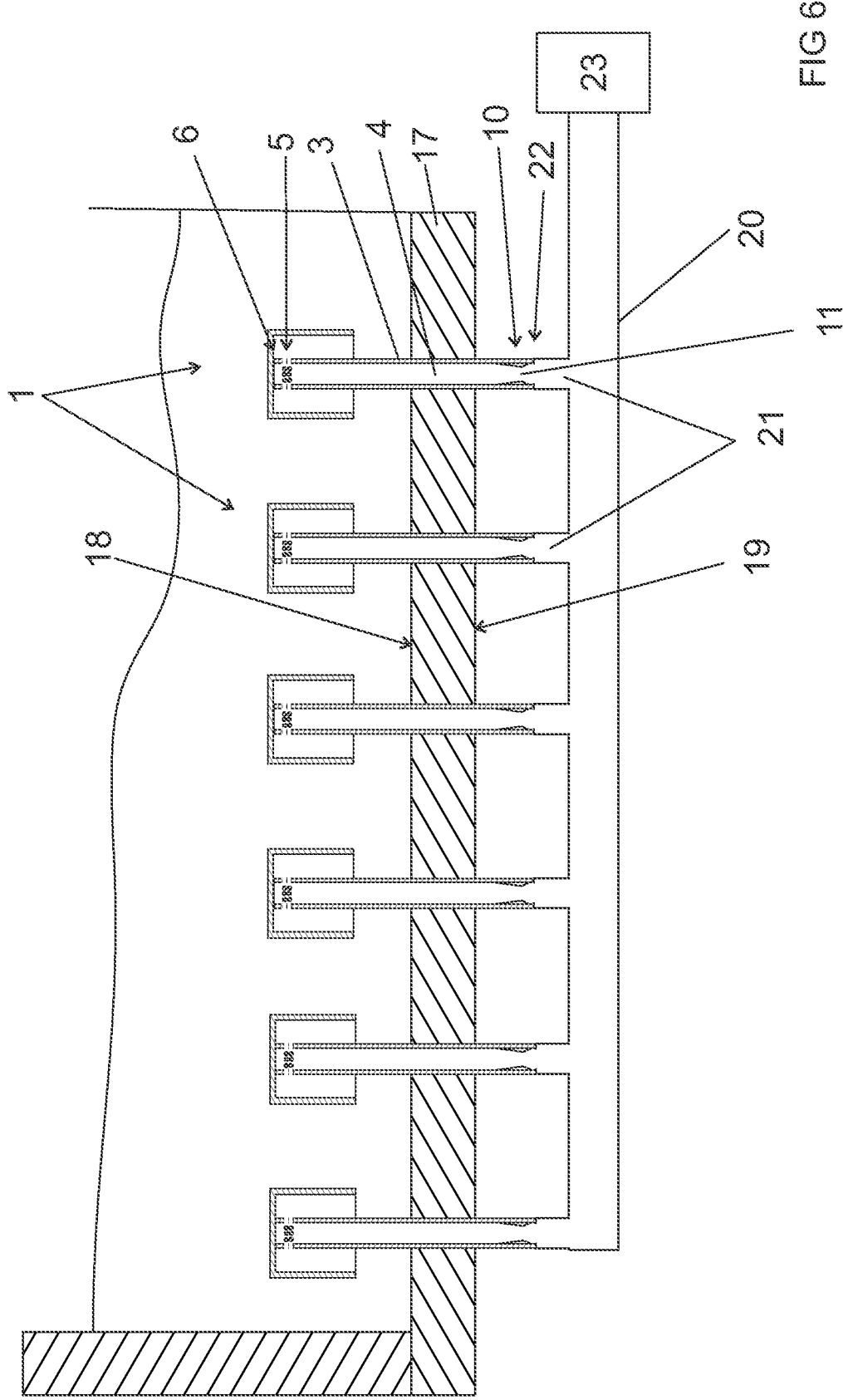

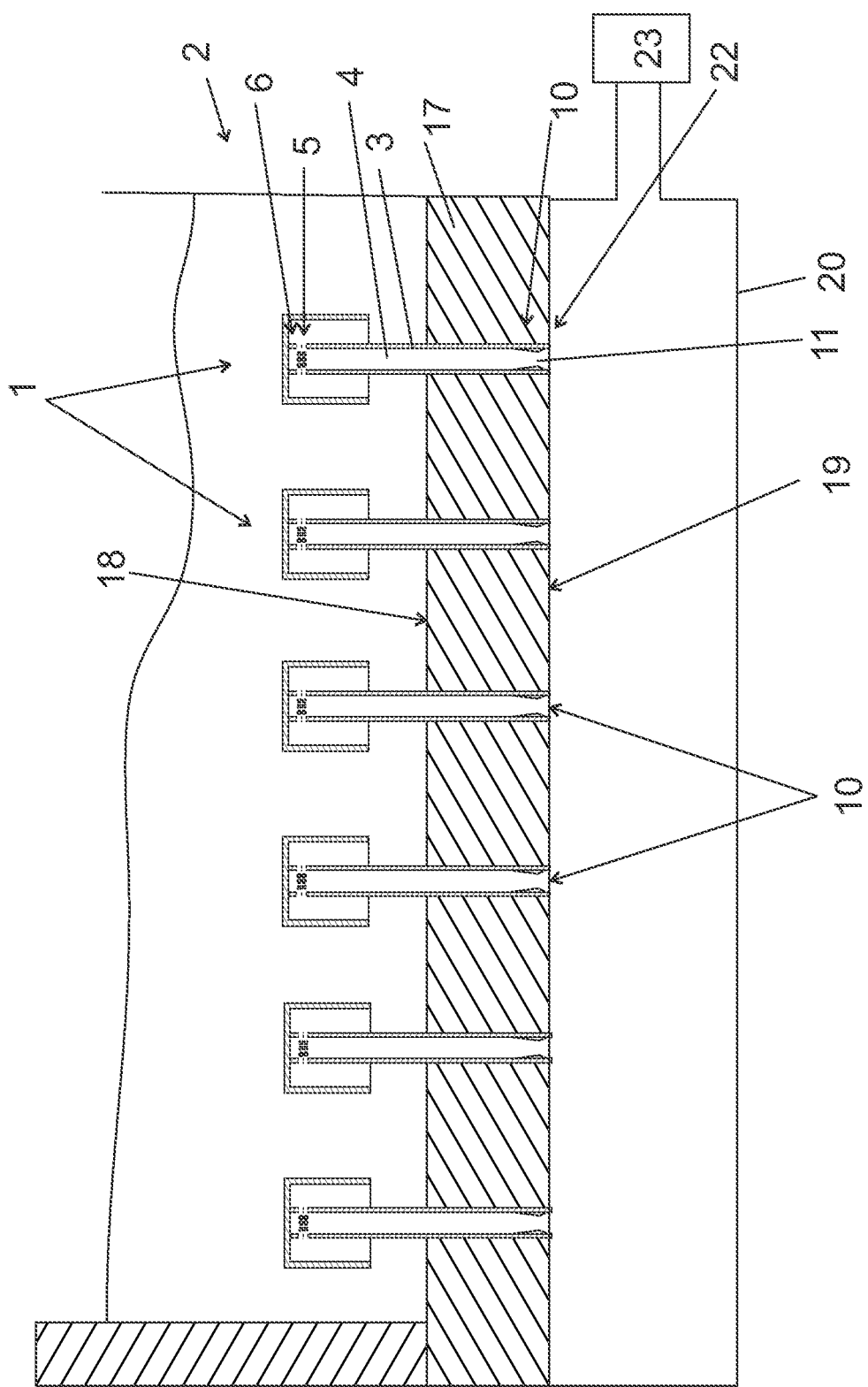

FLUIDIZING NOZZLE AND FLUIDIZED BED REACTOR

CROSS-REFERENCE TO RELATED APPLICATIONS

This application is a continuation of PCT International Application No. PCT/FI2020/050399, filed Jun. 9, 2020, the disclosure of this application is expressly incorporated herein by reference in its entirety.

FIELD

The invention relates to a fluidizing nozzle for introducing fluid such as gas into a reactor or the like.

The invention also relates to a fluidized bed reactor.

Publication WO 2012/115845 presents a fluidizing bed with fluidizing nozzles.

A problem with such fluidizing bed with a plurality fluidizing nozzles, such as between 10 and 10000 fluidizing nozzles, is that for proper function of the fluidizing bed, the flow of fluid created by fluid fed from the fluidizing nozzles must be uniform throughout the fluidizing bed. This sets requirements on the uniformity of the design and dimensions of the fluidizing nozzles of the fluidizing bed meaning that all fluidizing nozzles should have the same pressure loss at a specified flow. One way to achieve a uniform pressure loss for all fluidizing nozzles is to provide all fluidizing nozzles of a fluidizing bed reactor with fluid discharge openings having the same design and the same dimensions. This also means that wearing and blocking of the fluid discharge opening(s) of at least one fluidizing nozzle of the fluidizing bed reactor affects negatively the uniformity of the flow, because in such situation the fluid discharge opening(s) of said at least one fluidizing nozzle will have a design and dimensions, which do not correspond to the design and the dimensions of the fluid discharge opening(s) of the rest of the fluidizing nozzles of the fluidized bed reactor. Known solutions to this problem is to manufacture the fluidizing nozzles with high accuracy of materials having high heat and high wear resistance due to process requirements. To manufacture a large number of fluidizing nozzles each having fluid discharge opening(s) with exactly the same design and dimensions of materials having high heat and high wear resistance can be difficult and thus handling of these material is quite challenging.

OBJECTIVE OF THE INVENTION

The object is to provide a fluidizing nozzle that can be used in fluidized bed reactors for creating an even flow of fluid and to provide a fluidizing bed reactor.

LIST OF FIGURES

Figure 2:
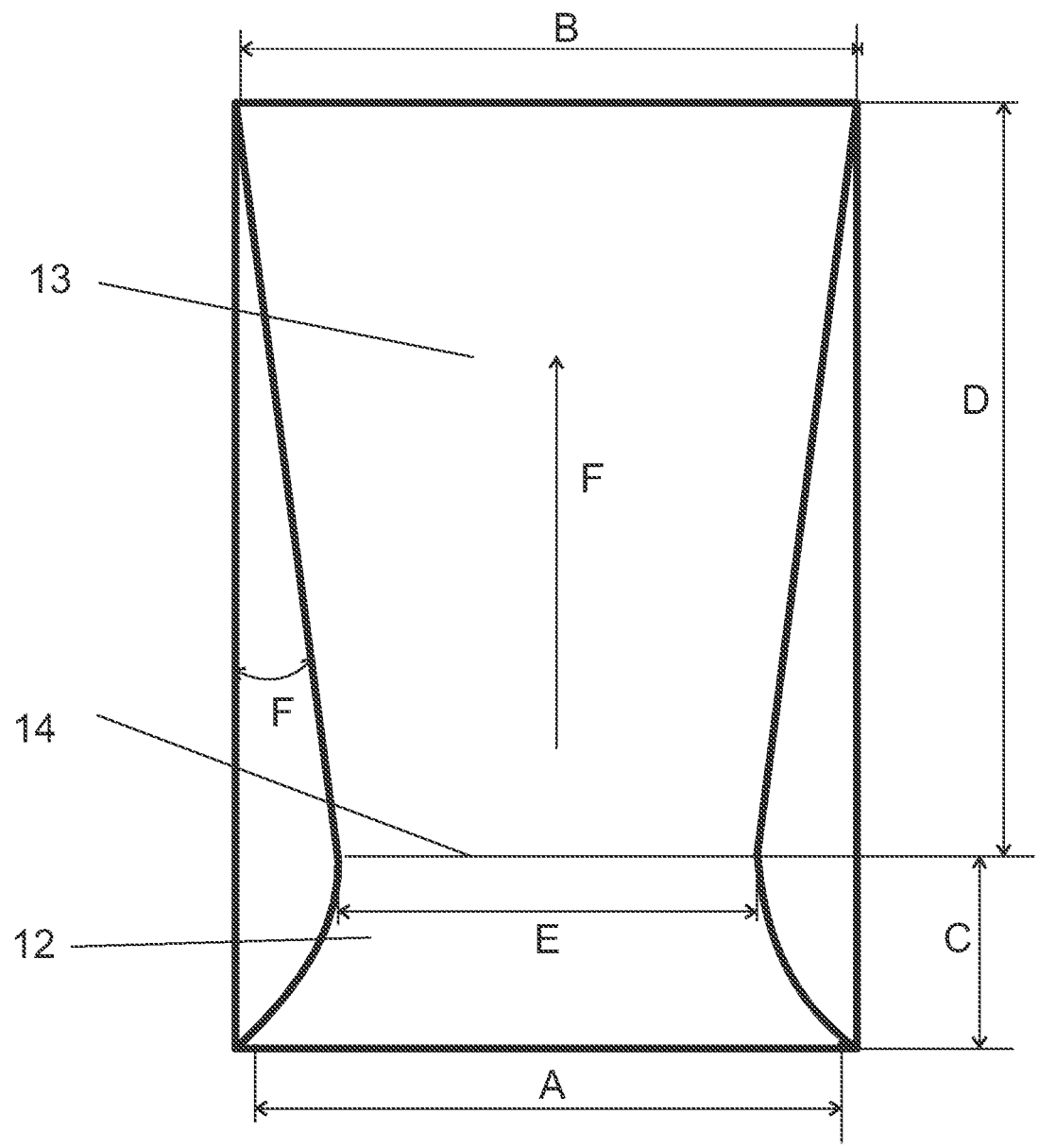
Figure 3:
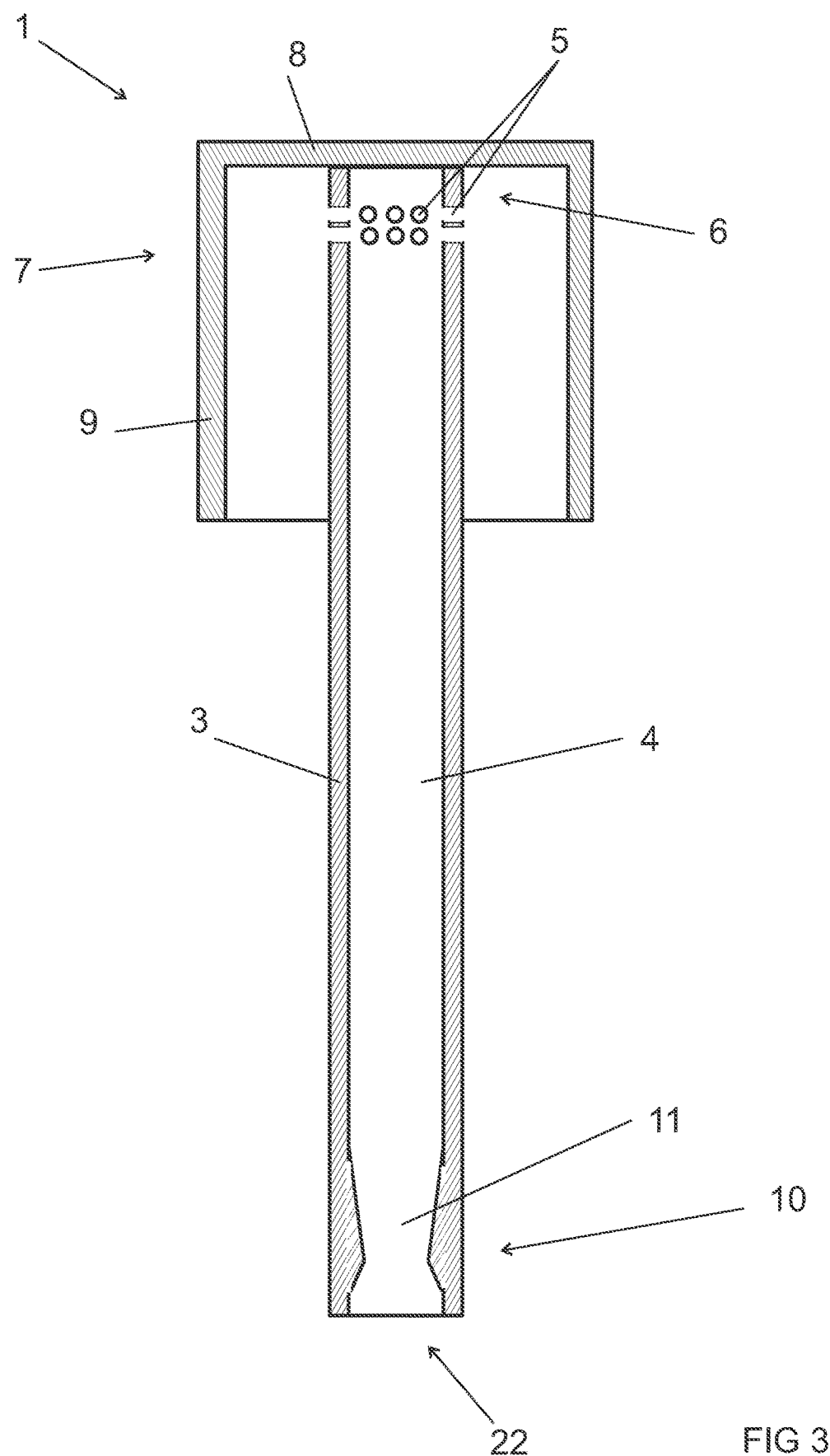
Figure 4:
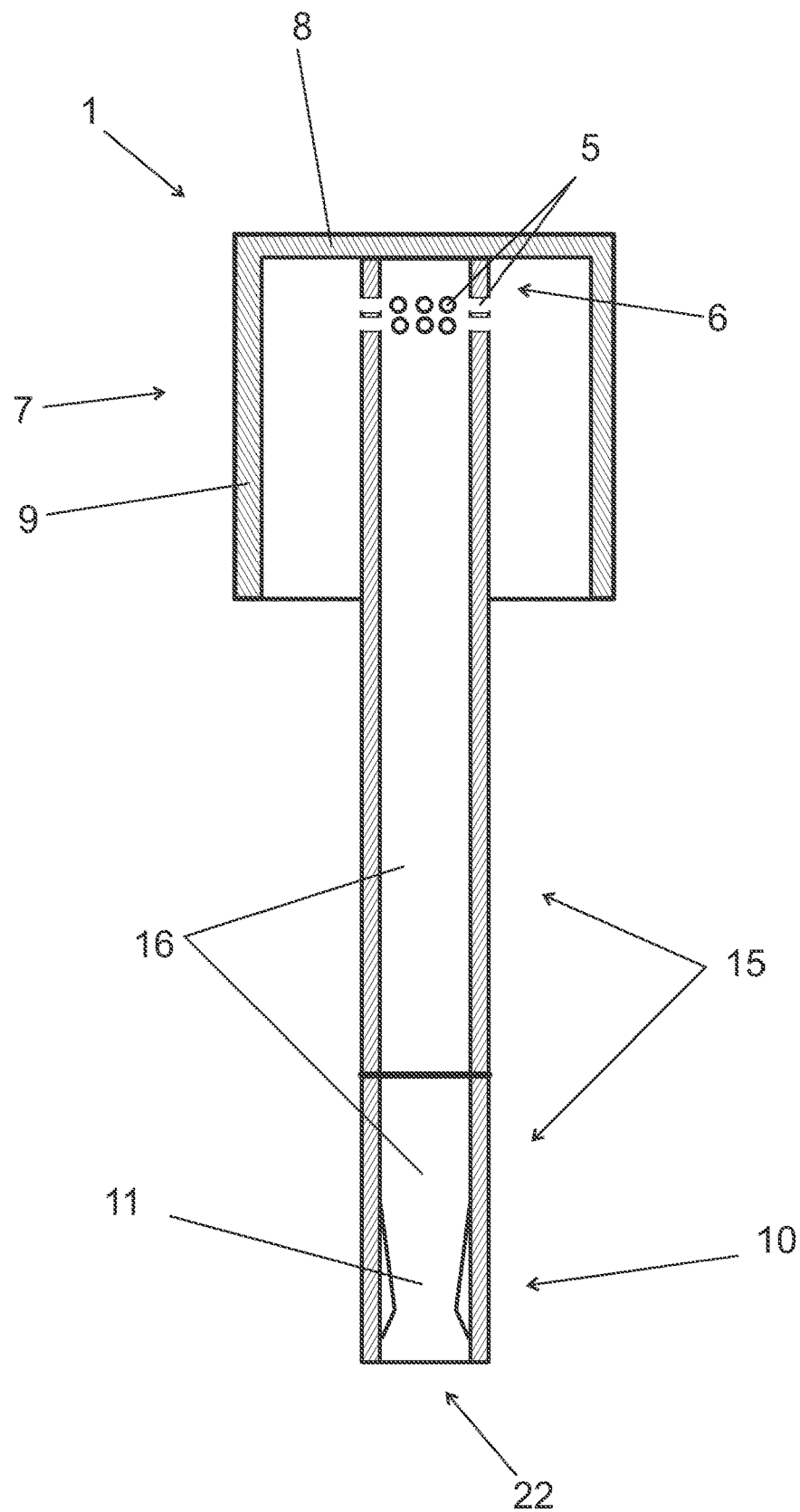
Figure 5:
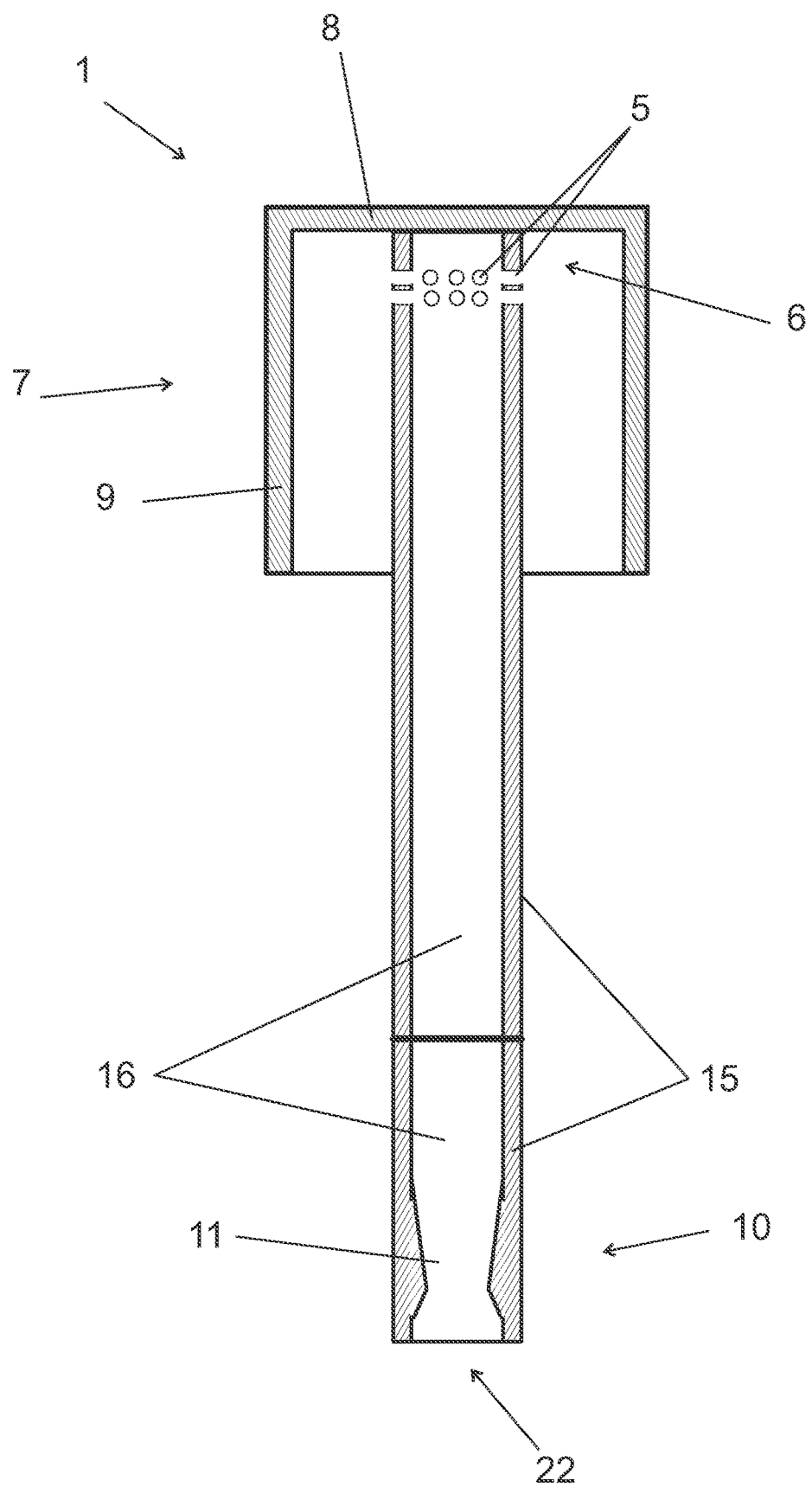

In the following the invention will described in more detail by referring to the figures of which FIG. 1 shows in cross section view a first embodiment of the fluidizing nozzle where a flow restriction element in the form of a separate part is provided in the feed channel of the fluidizing nozzle, FIG. 2 is a schematic illustration of a flow restriction element that is in the form of a separate part that can be provided in a feed channel of a fluidizing nozzle, FIG. 3 shows in cross section view a second embodiment of the fluidizing nozzle where the flow restriction element is arranged integrated in a channel inner wall of the feed channel of the fluidizing nozzle, FIG. 4 shows in cross section view a third embodiment of the fluidizing nozzle where the nozzle tube comprises several nozzle tube sections and where a flow restriction element in the form of a separate part that is provided in the feed channel section of one of the several nozzle tube sections, FIG. 5 shows in cross section view a fourth embodiment of the fluidizing nozzle where the nozzle tube comprises several nozzle tube sections and where a flow restriction element is arranged integrated in the channel inner wall of the feed channel section of one of the several nozzle tube sections, FIG. 6 shows in cross section view a detail of a first embodiment of the fluidizing bed reactor, where the fluidized bed reactor comprises a manifold arrangement, and FIG. 7 shows in cross section view a detail of a second embodiment of the fluidizing bed reactor where the fluidized bed reactor comprises a wind box arrangement.

DETAILED DESCRIPTION OF THE INVENTION

First the fluidizing nozzle 1 for introducing fluid such as gas into a fluidized bed reactor 2 or the like and some embodiments and variants of the fluidizing nozzle 1 will be described in greater detail.

The fluidizing nozzle 1 comprises a nozzle tube 3 limiting at least a part of a feed channel 4 in which fluid is configured to flow.

The fluidizing nozzle 1 comprises at least one fluid discharge opening 5 arranged near a downstream end 6 of the nozzle tube 3 for discharging fluid from the nozzle tube 3 to the surroundings.

The fluidizing nozzle 1 comprises a pot-like hood 7, which sealingly closes the nozzle tube 3 with a hood cover 8 at the downstream end 6 of the nozzle tube 3 at which said at least one fluid discharge opening 5 is provided, wherein the pot-like hood 7 includes a hood apron 9 connected with the hood cover 8, which hood apron 9 surrounding a part of the nozzle tube 3 by forming an annular cap extending from the downstream end 6 of the nozzle tube 3 at which said at least one fluid discharge opening 5 is provided.

The feed channel 4 is provided with a flow restriction element 10 defining at least one flow restriction feed channel 11 upstream of said at least one fluid discharge opening 5.

The flow restriction element 10 will cause a drop in the fluid pressure as the fluid passes the fluid restriction element 10.

If several fluidizing nozzles 1 having such flow restriction elements are used in a fluidized bed reactor 2, the result of this will be that the flow restriction elements 10 in each fluidizing nozzle 1 will together through the pressure drop produced by the flow restriction elements 10 in each fluidizing nozzle 1 even out possible differences between the fluid flow produced by each fluidizing nozzle 1 of the fluidized bed reactor 2 already before i.e. upstream of the fluid discharging opening(s) 5 for discharging fluid from the nozzle tube 3 to the surroundings from each fluidizing nozzle 1. Because the pressure drop is in each fluidizing nozzle 1 of the fluidized bed reactor 2 at the fluid discharging opening(s) 5 for discharging fluid from the nozzle tube 3 to the surroundings from each fluidizing nozzle 1, e.g. due to blocking and/or wear of fluid discharge opening(s) 5 will have a smaller impact on the uniformity of the flow of fluid at a bed floor 17 configured to carry material to be treated in the fluidized bed reactor 2.

Because the flow restriction elements 10 will additionally limit the amount of fluid that can pass the flow restriction element 10, the result will be an uniform flow of fluid throughout a bed floor 17 configured to carry material to be treated in the fluidized bed reactor 2, because possible differences in the fluid flow discharged from individual fluidizing nozzles 1 will be evened out.

Because the fluid pressure is reduced, the fluid discharge opening 5 for discharging fluid from the nozzle tube 3 to the surroundings can be made bigger and the result of this is that the fluid flow velocity of the fluid discharged from the fluid discharge openings 5 will be lower. The result of this is that the impact on particles carried on the bed floor 17 will also be lower in terms of particle breakage, thus reducing the velocity of the particles carried on the fluidized bed 17 and therethrough also possible abrasive and/or erosive wear of the fluidizing nozzles 1 of the fluidized bed reactor 2 caused by said particles.

The flow restriction element 10 is preferably, but not necessarily, configured to solely allow fluid to pass the flow restriction element 10 through said at least one flow restriction feed channel 11 of the flow restriction element 10.

Alternatively or additionally can the flow restriction element 10 be configured to allow fluid to pass the flow restriction element 10 between the flow restriction element 10 and the feed channel 4.

Said at least one flow restriction feed channel 11 is preferably, but not necessarily, as presented in FIG. 2, defined by an upstream toroidal inlet 12 having an inlet diameter A, a downstream outlet cone 13 having an exit diameter B that corresponds to the inlet diameter A of the upstream toroidal inlet 12, and a throat 14 between the upstream toroidal inlet 12 and the downstream outlet cone 13 so that the length C of the upstream toroidal inlet 12 being shorter than the length D of the downstream outlet cone 13 as measured in the direction of flow F. The flow restriction element 10 defines preferably, but not necessarily, only one flow restriction feed channel 11, and said only one flow restriction feed channel 11 is preferably, but not necessarily, in the form of a sonic nozzle. The design and the dimensions of said at least one flow restriction feed channel 11 forms preferably, but not necessarily, a venturi as presented in FIG. 2. Fluid upstream of the throat 14 is at a higher pressure than that downstream of the throat 14. The fluid flowing into said at least one flow restriction feed channel 11 is accelerated in the upstream toroidal inlet 12. The velocity of the fluid in the throat 14 approaches preferably, but not necessarily, the speed of sound. Once this condition has been realized the flow rate through said at least one flow restriction feed channel 11 will remain constant even if the downstream pressure varies significantly, provided of course, that a pressure difference in the feed channel 4 between a location upstream of the throat 14 of the restriction feed channel 11 and a location downstream of the throat 14 of the restriction feed channel 11 will accordingly change, as well. The velocity of the fluid downstream of the throat 14 will be deaccelerated due to the increasing cross section of the feed channel 4 downstream the throat 14.

The length C of the upstream toroidal inlet 12 is preferably, but not necessarily, between E and 2.2E, where E is the diameter of the throat 14, the inlet diameter A diameter of the upstream toroidal inlet 12 is preferably, but not necessarily, between 2E and 6E, where E is the diameter of the throat 14, the length D of the downstream outlet cone 13 is preferably, but not necessarily, between 10E and 50E, where E is the diameter of the throat 14, the exit diameter B of the downstream outlet cone 13 is preferably, but not necessarily, between 2E and 6E, where E is the diameter of the throat 14, and the slant angle F of the downstream outlet cone 13 is preferably, but not necessarily, between 1 and 10° such as between 2 and 7°.

In the fluidizing nozzle 1, the flow restriction element 10 can be arranged inside the part of the feed channel 4 limited by the nozzle tube 3, as in the first embodiment of the fluidizing nozzle 1 illustrated in FIG. 1.

In the fluidizing nozzle 1, the flow restriction element 10 can be arranged immovably in the part of the feed channel 4 limited by the nozzle tube 3.

In the fluidizing nozzle 1, the flow restriction element 10 can be arranged integrated in a channel inner wall of the part of the feed channel 4 limited by the nozzle tube 3, as in the second embodiment of the fluidizing nozzle 1 illustrated in FIG. 3.

In the fluidizing nozzle 1, the part of the feed channel 4 limited by the nozzle tube 3 can have an essentially uniform cross section form between the downstream end 6 of the nozzle tube 3 at which said at least one fluid discharge opening 5 is provided and an upstream inlet end 22 of the nozzle tube 3, and the flow restriction element 10 is preferably, but not necessarily, in the form of a part separate from the nozzle tube 3 immovable arranged in the part of the feed channel 4 limited by the nozzle tube 3.

In the fluidizing nozzle 1, the nozzle tube 3 can, as in the third embodiment of the fluidizing nozzle illustrated in FIG. 4 and in the fourth embodiment of the fluidizing nozzle illustrated in FIG. 5, comprise several nozzle tube sections 15 each defining a feed channel section 16 so that said several nozzle tube sections 15 are connected together so that the feed channel sections 16 of said several nozzle tube sections 15 forming the part of the feed channel limited by the nozzle tube 3, and so that at least one feed channel section 16 of said several nozzle tube sections 15 being provided with the flow restriction element 10 defining said at least one flow restriction feed channel 11.

If the nozzle tube 3 of the fluidizing nozzle 1 comprises several nozzle tube sections 15 as presented, the flow restriction element 10 can be arranged inside the feed channel section 16 of one said several nozzle tube sections 15, as in the third embodiment of the fluidizing nozzle illustrated in FIG. 4.

If the nozzle tube 3 of the fluidizing nozzle 1 comprises several nozzle tube sections 15 as presented, the flow restriction element 10 can be arranged immovably in the feed channel section 16 of one of said several nozzle tube sections 15.

If the nozzle tube 3 of the fluidizing nozzle 1 comprises several nozzle tube sections 15 as presented, the flow restriction element 10 can be arranged integrated in the channel inner wall limiting the feed channel section 16 of one of said several nozzle tube sections 15, as in the fourth embodiment of the fluidizing nozzle illustrated in FIG. 5.

Next, the fluidized bed reactor 2 and some embodiments and variants of the fluidized bed reactor 2 will be described in greater detail.

The fluidized bed reactor 2 comprises a bed floor 17 having an upper material carrying surface 18 and a lower surface 19.

The fluidized bed reactor 2 comprises a plurality of fluidizing nozzles 1 projecting through the bed floor 17.

The fluidized bed reactor 2 comprises a fluid distribution arrangement 20 provided with a plurality of fluid outlet means 21 and with a pump means 23 configured to create a flow of fluid in the fluid distribution arrangement 20. Because fluid will flow, fluid will have a fluid pressure in the fluid distribution arrangement 20. This follows from law of nature.

The fluid distribution arrangement 20 can for example be of manifold type as illustrated in FIG. 6 or of wind box type as illustrated in FIG. 7.

Each fluid outlet means 21 of the fluid distribution arrangement 20 is in fluid connection with one fluidizing nozzle of said plurality of fluidizing nozzles 1.

The fluid distribution arrangement 20 is arranged at a level below the bed floor 17.

Each fluidizing nozzle 1 of said plurality of fluidizing nozzles 1 comprise a nozzle tube 3 having an upstream inlet end 22 connected to one fluid outlet means 21 of said plurality of fluid outlet means 21. The nozzle tube 3 limits at least a part of a feed channel 4 in which fluid is configured to flow.

Each fluidizing nozzle 1 of said plurality of fluidizing nozzles 1 comprise least one fluid discharge opening 5 arranged near a downstream end 6 of the nozzle tube 3 for discharging fluid from the nozzle tube 3 to the surroundings.

Each fluidizing nozzle 1 of said plurality of fluidizing nozzles 1 comprise a pot-like hood 7, which sealingly closes the nozzle tube 3 with a hood cover 8 of the pot-like hood 7 at the downstream end 6 of the nozzle tube 3 at which said at least one fluid discharge opening 5 is provided. The pot-like hood 7 includes a hood apron 9 connected with the hood cover 8, which hood apron 9 surrounding a part of the nozzle tube 3 by forming an annular cap extending from the downstream end 6 of the nozzle tube 3 at which said at least one fluid discharge opening 5 is provided.

Each nozzle tube 3 of each fluidizing nozzle 1 defines together with one fluid outlet means 21 of the fluid distribution arrangement 20 to which the nozzle tube 3 is connected the feed channel 4 in which fluid is configured to flow.

In the fluidized bed reactor 2 each feed channel 4 is provided with a flow restriction element 10 defining at least one flow restriction feed channel 11. The flow restriction element 10 is provided upstream of said at least one fluid discharge opening 5 of the fluidizing nozzle 1.

The flow restriction element 10 will cause a drop in the fluid pressure as the fluid passes the flow restriction element 10.

The result of this will be that the flow restriction elements 10 in each fluidizing nozzle 1 will together through the pressure drop produced by the flow restriction elements 10 in each fluidizing nozzle 1 even out possible differences between the fluid flow produced by each fluidizing nozzle 1 on the fluidized bed reactor 2 already before i.e. upstream of the fluid discharging opening(s) 5 for discharging fluid from the nozzle tube 3 to the surroundings from each fluidizing nozzle 1. Thus the pressure drop is in each fluidizing nozzle 1 of the fluidized bed reactor 2 at the fluid discharging opening(s) 5 for discharging fluid from the nozzle tube 3 to the surroundings from each fluidizing nozzle 1, e.g. due to blocking and/or wear of fluid discharge opening(s) 5 will have a smaller impact on the uniformity of the flow of fluid at the bed floor 17 configured to carry material to be treated in the fluidized bed reactor 2.

Because the flow restriction elements 10 in each feed channel 4 will additionally limit the amount of fluid that can pass the flow restriction element 10 in the feed channel, the result will be an uniform flow of fluid throughout a bed floor 17 configured to carry material to be treated in the fluidized bed reactor 2. because possible differences in the fluid flow discharged from individual fluidizing nozzles 1 will be evened out.

Because the fluid pressure is reduced, the fluid discharge opening 5 for discharging fluid from the nozzle tube 3 to the surroundings can be made bigger and the result of this is that the fluid flow velocity of the fluid discharged from the fluid discharge openings 5 will be lower. The result of this is that the impact on particles in terms of particle breakage carried on the bed floor 17 will also be lower, thus reducing the velocity of the particles carried on the fluidized bed 17 and therethrough also possible abrasive and/or erosive wear of the fluidizing nozzles 1 of the fluidized bed reactor 2 caused by said particles.

Each flow restriction element 10 or at least some of the flow restriction elements 10 is preferably, but not necessarily, configured to solely allow fluid to pass the flow restriction element 10 through said at least one flow restriction feed channel 11 in the flow restriction element 10.

Alternatively or additionally can each flow restriction element 10 at least some of the flow restriction elements 10 be configured to allow fluid to pass the flow restriction element 10 between the flow restriction element 10 and the feed channel 4.

Said at least one flow restriction feed channel 11 of each flow restriction element 10 or of at least some of the flow restriction elements 10 is preferably, but not necessarily, as presented in FIG. 2, defined by a upstream toroidal inlet 12 having an inlet diameter A, a downstream outlet cone 13 having an exit diameter B that corresponds to the inlet diameter A of the upstream toroidal inlet 12, and a throat 14 between the upstream toroidal inlet 12 and the downstream outlet cone 13, so that the length C of the upstream toroidal inlet 12 is preferably, but not necessarily, shorter than the length D of the downstream outlet cone 13 as measured in the direction of flow F. The flow restriction element 10 defining preferably, but not necessarily, only one flow restriction feed channel 11, and said only one flow restriction feed channel 11 is preferably, but not necessarily, in the form of a sonic nozzle. The design and the dimensions of said at least one flow restriction feed channel 11 forms preferably, but not necessarily, a venturi. Fluid upstream of the throat 14 is at a higher pressure than that downstream of the throat 14. The fluid flowing into said at least one flow restriction feed channel 11 is accelerated in the upstream toroidal inlet 12. The velocity of the fluid in the throat 14 approaches preferably, but not necessarily, the speed of sound. Once this condition has been realized the flow rate through said at least one flow restriction feed channel 11 will remain constant even if the downstream pressure varies significantly, provided of course, that a pressure difference in the feed channel 4 between a location upstream of the throat 14 of the restriction feed channel 11 and a location downstream of the throat 14 of the restriction feed channel 11 is accordingly changed as well. The velocity of the fluid downstream of the throat 14 will be deaccelerated due to the increasing cross section of the feed channel 4 downstream the throat 14.

The length C of the upstream toroidal inlet 12 is preferably, but not necessarily, between E and 2.2E, where E is the diameter of the throat 14, the inlet diameter A diameter of the upstream toroidal inlet 12 is preferably, but not necessarily, between 2E and 6E, where E is the diameter of the throat 14, the length D of the downstream outlet cone 13 is preferably, but not necessarily, between 10E and 50E, where E is the diameter of the throat 14, the exit diameter B of the downstream outlet cone 13 is preferably, but not necessarily, between 2E and 6E, where E is the diameter of the throat 14, and the slant angle F of the downstream outlet cone 13 is preferably, but not necessarily, between 1 and 10° such as between 2 and 7°.

In each fluidizing nozzle 1 or in at least some of the fluidizing nozzles 1 of the fluidized bed reactor 2 the flow restriction element 10 can be arranged inside the feed channel 4, as illustrated in FIGS. 6 and 7.

In each fluidizing nozzle 1 or in at least some of the fluidizing nozzles 1 of the fluidized bed reactor 2 the flow restriction element 10 can be arranged immovably in the feed channel 4.

In each fluidizing nozzle 1 or in at least some of the fluidizing nozzles 1 of the fluidized bed reactor 2 the flow restriction element 10 can be arranged integrated in the part of the feed channel 4 limited by the nozzle tube 3, as illustrated in FIG. 3.

In each fluidizing nozzle 1 or in at least some of the fluidizing nozzles 1 of the fluidized bed reactor 2 the part of the feed channel 4 limited by the nozzle tube 3 can have an essentially uniform cross section form between the downstream end 6 of the nozzle tube 3 at which said at least one fluid discharge opening 5 is provided and an upstream inlet end 22 of the nozzle tube 3, and the flow restriction element 10 is preferably, but not necessarily, formed by a nozzle element in the form of a separate part that is immovable arranged in the part of the feed channel 4 limited by the nozzle tube 3.

In each fluidizing nozzle 1 or in at least some of the fluidizing nozzles 1 of the fluidized bed reactor 2 the nozzle tube 3 can comprise several nozzle tube sections 15 each defining a feed channel section 16, so that said several nozzle tube sections 15 are connected together so that the feed channel sections 16 of said several nozzle tube sections 15 forming the part of the feed channel limited by the nozzle tube 3, and so that at least one feed channel section 16 of said several nozzle tube sections 15 is provided with the flow restriction element 10 defining said at least one flow restriction feed channel 11.

If the nozzle tube 3 of each fluidizing nozzle 1 or of at least some of the fluidizing nozzles 1 comprises several nozzle tube sections 15 as presented, the flow restriction element 10 can be arranged inside the feed channel section 16 of one said several nozzle tube sections 15.

If the nozzle tube 3 of each fluidizing nozzle 1 or of at least some of the fluidizing nozzles 1 comprises several nozzle tube sections 15 as presented, the flow restriction element 10 can be arranged immovably in the feed channel section 16 of one of said several nozzle tube sections 15, as illustrated in FIG. 4.

If the nozzle tube 3 of each fluidizing nozzle 1 or of at least some of the fluidizing nozzles 1 comprises several nozzle tube sections 15 as presented, the flow restriction element 10 can be arranged integrated in the channel inner wall limiting the feed channel section 16 of one of said several nozzle tube sections 15, as illustrated in FIG. 5.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A fluidizing nozzle for introducing fluid such as gas into a fluidized bed reactor, comprising:
a nozzle tube limiting at least a part of a feed channel in which fluid is configured to flow,
at least one fluid discharge opening arranged near a downstream end of the nozzle tube for discharging fluid from the nozzle tube to the surroundings, and
a pot-like hood, which sealingly closes the nozzle tube with a hood cover of the pot-like hood at the downstream end of the nozzle tube at which said at least one fluid discharge opening is provided, wherein the pot-like hood includes a hood apron connected with the hood cover, which hood apron surrounding a part of the nozzle tube by forming an annular cap extending from the downstream end of the nozzle tube at which said at least one fluid discharge opening is provided,
wherein the feed channel being provided with a flow restriction element defining at least one flow restriction feed channel upstream of said at least one fluid discharge opening,
wherein
the flow restriction element defining only one flow restriction feed channel, and by said only one flow restriction feed channel being in the form of a sonic nozzle.

2. The fluidizing nozzle according to claim 1, wherein the flow restriction element being configured to solely allow fluid to pass the flow restriction element through said at least one flow restriction feed channel of the flow restriction element.

3. The fluidizing nozzle according to claim 1, wherein said at least one flow restriction feed channel being defined by a upstream toroidal inlet having an inlet diameter A, a downstream outlet cone having an exit diameter B that corresponds to the inlet diameter A of the upstream toroidal inlet, and a throat between the upstream toroidal inlet and the downstream outlet cone, and
the length C of the upstream toroidal inlet being shorter than the length D of the downstream outlet cone as measured in the direction of flow F of the fluid.

4. The fluidizing nozzle according to claim 3, wherein by the length C of the upstream toroidal inlet is between E and 2.2E, where E is the diameter of the throat,
the inlet diameter A diameter of the upstream toroidal inlet is between 2E and 6E, where E is the diameter of the throat,
the length D of the downstream outlet cone is between 10E and 50E, where E is the diameter of the throat,
the exit diameter B of the downstream outlet cone is between 2E and 6E, where E is the diameter of the throat, and
a slant angle F of the downstream outlet cone is between 1 and 10° such as between 2 and 7°.

5. The fluidizing nozzle according to claim 1, wherein the flow restriction element being arranged inside the part of the feed channel limited by the nozzle tube.

6. The fluidizing nozzle according to claim 1, wherein the flow restriction element being arranged immovably in the part of the feed channel limited by the nozzle tube.

7. The fluidizing nozzle according to claim 1, wherein the flow restriction element being arranged integrated in a channel inner wall of the part of the feed channel limited by the nozzle tube.

8. The fluidizing nozzle according to claim 1, wherein the part of the feed channel limited by the nozzle tube having an essentially uniform cross section form between the downstream end of the nozzle tube at which said at least one fluid discharge opening is provided and an upstream inlet end of the nozzle tube, and the flow restriction element being formed by a nozzle element in the form of a separate part that is immovable arranged in the part of the feed channel limited by the nozzle tube.

9. The fluidizing nozzle according to claim 1, wherein
the nozzle tube comprises several nozzle tube sections each defining a feed channel section, wherein said several nozzle tube section being connected together so that the feed channel sections of said several nozzle tube sections forming the part of the feed channel limited by the nozzle tube, and
at least one feed channel section of said several nozzle tube sections being provided with the flow restriction element defining said at least one flow restriction feed channel.

10. The fluidizing nozzle according to claim 9, wherein the flow restriction element being arranged inside the feed channel section of one of said several nozzle tube sections.

11. The fluidizing nozzle according to claim 9, wherein the flow restriction element being arranged immovably in the feed channel section of one of said several nozzle tube sections.

12. The fluidizing nozzle according to claim 11, wherein the flow restriction element being arranged integrated in the channel inner wall limiting the feed channel section in one of said several nozzle tube sections.

13. A fluidized bed reactor, comprising
a bed floor having an upper material carrying surface and a lower surface,
a plurality of fluidizing nozzles projecting through the bed floor, and
a fluid distribution arrangement provided with a plurality of fluid outlet means,
wherein each fluid outlet means of the fluid distribution arrangement is in fluid connection with one fluidizing nozzle of said plurality of fluidizing nozzles,
wherein the fluid distribution arrangement is arranged at a level below the bed floor, and
wherein each fluidizing nozzle of said plurality of fluidizing nozzles comprise
  a nozzle tube having an upstream inlet end connected to one fluid outlet means of said plurality of fluid outlet means, wherein the nozzle tube limiting at least a part of a feed channel in which fluid is configured to flow,
  at least one fluid discharge opening arranged near a downstream end of the nozzle tube for discharging fluid from the nozzle tube to the surroundings, and
  a pot-like hood, which sealingly closes the nozzle tube with a hood cover at the downstream end of the nozzle tube at which said at least one fluid discharge opening is provided, wherein the pot-like hood includes a hood apron connected with the hood cover, which hood apron surrounding a part of the nozzle tube by forming an annular cap extending from the downstream end of the nozzle tube at which said at least one fluid discharge opening is provided,
  wherein each nozzle tube of each fluidizing nozzle together with one fluid outlet means of the fluid distribution arrangement to which the nozzle tube is connected defining the feed channel in which fluid is configured to flow, and
  wherein each feed channel being provided with a flow restriction element defining at least one flow restriction feed channel upstream of said at least one fluid discharge opening of the fluidizing nozzle,
wherein the flow restriction element defining only one flow restriction feed channel, and by said only one flow restriction feed channel being in the form of a sonic nozzle.

14. The fluidized bed reactor according to claim 13, wherein
the flow restriction element being configured to solely allow fluid to pass the flow restriction element through said at least one flow restriction feed channel in the flow restriction element.

15. The fluidized bed reactor according to claim 13, wherein
said at least one flow restriction feed channel being defined by a upstream toroidal inlet having an inlet diameter A, a downstream outlet cone having an exit diameter B that corresponds to the inlet diameter A of the upstream toroidal inlet, and a throat between the upstream toroidal inlet and the downstream outlet cone, and
the length C of the upstream toroidal inlet being shorter than the length D of the downstream outlet cone as measured in the direction of flow F of the fluid.

16. The fluidized bed reactor according to claim 15, wherein
the length C of the upstream toroidal inlet is between E and 2.2E, where E is the diameter of the throat,
the inlet diameter A diameter of the upstream toroidal inlet is between 2E and 6E, where E is the diameter of the throat,
the length D of the downstream outlet cone is between 10E and 50E, where E is the diameter of the throat,
the exit diameter B of the downstream outlet cone is between 2E and 6E, where E is the diameter of the throat, and
a slant angle F of the downstream outlet cone is between 1 and 10° such as between 2 and 7°.

17. The fluidized bed reactor according to claim 13, wherein
the flow restriction element being arranged inside the feed channel.

18. The fluidized bed reactor according to claim 13, wherein
the flow restriction element being arranged immovably in the feed channel.

19. The fluidized bed reactor according to claim 13, wherein
the flow restriction element being arranged integrated in the part of the feed channel limited by the nozzle tube.

20. The fluidized bed reactor according to claim 13, wherein
the part of the feed channel limited by the nozzle tube having an essentially uniform cross section form between the downstream end of the nozzle tube at which said at least one fluid discharge opening is provided and an upstream inlet end of the nozzle tube, and
the flow restriction element being formed in the form of a separate part that is immovable arranged in the part of the feed channel limited by the nozzle tube.

21. The fluidized bed reactor according to claim 13, wherein
the nozzle tube comprises several nozzle tube sections each defining a feed channel section, wherein said several nozzle tube sections being connected together so that the feed channel sections of said several nozzle tube sections forming the part of the feed channel limited by the nozzle tube, and at least one feed channel section of said several nozzle tube sections being provided with the flow restriction element defining said at least one flow restriction feed channel.

22. The fluidized bed reactor according to claim 21, wherein
the flow restriction element being arranged inside the feed channel section of one of said several nozzle tube sections.

23. The fluidized bed reactor according to claim 21, wherein
the flow restriction element being arranged immovably in the feed channel section of one of said several nozzle tube sections.

24. The fluidized bed reactor according to claim 21, wherein
the flow restriction element being arranged integrated in the channel inner wall limiting the feed channel section in one of said several nozzle tube sections.

* * * * *